United States Patent [19]
Machii

[11] Patent Number: 6,089,730
[45] Date of Patent: Jul. 18, 2000

[54] ILLUMINATION APPARATUS AND PROJECTOR

[75] Inventor: Ritsuo Machii, Mito, Japan

[73] Assignee: Canon Kabushiki Kaisha, Tokyo, Japan

[21] Appl. No.: 09/178,565

[22] Filed: Oct. 23, 1998

[30] Foreign Application Priority Data

Oct. 27, 1997 [JP] Japan ..................................... 9-309488

[51] Int. Cl.⁷ .................................................. G03B 21/16
[52] U.S. Cl. .......................... 362/293; 362/296; 362/302; 362/303; 362/304
[58] Field of Search ..................... 362/293, 296, 362/302, 303, 304; 353/61, 52, 54

[56] References Cited

U.S. PATENT DOCUMENTS 5,313,234 5/1994 Edmonson et al. ..................... 353/61

*Primary Examiner*—Cassandra Spyrou
*Assistant Examiner*—Mohammad Y. Sikder
*Attorney, Agent, or Firm*—Morgan & Finnegan, LLP

[57] ABSTRACT

An illumination apparatus includes a lamp, and a holding member for rotatably holding the lamp about its optical axis as a rotational axis. An projector includes the illumination apparatus, a first optical system for separating white light from the illumination apparatus into light of red, green and blue, a first panel for modulating the light of red per each pixel, a second panel for modulating the light of green per each pixel, a third panel for modulating the light of blue per each pixel, a projection lens, and a second optical system for superimposing the modulated light of red, green and blue on a display surface, such as a screen, in cooperation with the projection lens.

13 Claims, 5 Drawing Sheets

ILLUMINATION APPARATUS AND PROJECTOR

BACKGROUND OF THE INVENTION

1. Field of the Invention

The present invention relates to an illumination apparatus usable in a liquid crystal projector and the like, and a projector provided with the illumination apparatus.

2. Related Background Art

In an optical system of a liquid crystal projector disclosed in Japanese Patent Application Laid-Open No. 10-148795, since shapes of pupils of light of red (R), green (G) and blue (B) are not the same, color unevenness occurs on its screen.

Further, in an optical system of a liquid crystal projector as disclosed in Japanese Patent Application Laid-Open No. 63-116123, since optical lengths are different among three colors of R, G and B, color unevenness occurs on its screen.

Furthermore, in an illumination apparatus using a high-pressure discharge lamp of a reflection-type light source, since heat is radiated through heat-resisting cement and a reflection mirror, temperature of a light radiation tube on its side fixed to the reflection mirror through the heat-resisting cement is lowered when an alternating current with symmetric positive and negative components is supplied to the high-pressure discharge lamp. Hence, color unevenness occurs in the lamp itself, and a case where color unevenness occurs on a screen may occur when such a lamp is used as a light source of a liquid crystal projector.

SUMMARY OF THE INVENTION

An object of the present invention is to provide an illumination apparatus capable of readily adjusting color unevenness on a screen, and a projector apparatus including the illumination apparatus.

An illumination apparatus of the present invention includes a lamp, and a holding member for rotatably holding the lamp about its optical axis as a rotational axis. The optical axis passes through the lamp. More specifically, the lamp may include a light radiation tube and a concave mirror which may be one of an ellipsoidal mirror and a parabolic mirror.

A projector of the present invention includes the above illumination apparatus, a first optical system for separating white light from the illumination apparatus into light of red, green and blue, a first panel for modulating the light of red per each pixel, a second panel for modulating the light of green per each pixel, a third panel for modulating the light of blue per each pixel, a projection lens, and a second optical system for superimposing the modulated light of red, green and blue on a display surface, such as a screen, in cooperation with the projection lens.

Further, a method for reducing color unevenness on a display surface of a projector includes a step of obtaining data of the color unevenness at each rotational position while rotating a lamp about its optical axis as a rotational axis, and a step of seeking the rotational position at which the color unevenness is most reduced, based on the data of the color unevenness. More specifically, in the above method, the lamp is rotatable being held by a rotatable holding member, the lamp may include a light radiation tube and a concave mirror which may be one of an ellipsoidal mirror and a parabolic mirror, and the projector may include a first optical system for separating white light from the lamp into light of red, green and blue, a first panel for modulating the light of red per each pixel, a second panel for modulating the light of green per each pixel, a third panel for modulating the light of blue per each pixel, a projection lens, and a second optical system for superimposing the modulated light of red, green and blue on a display surface, such as a screen, in cooperation with a projection lens. Furthermore, the first, second and third panels may include liquid crystal display elements, respectively.

DETAILED DESCRIPTION OF THE PREFERRED EMBODIMENTS

An embodiment of the present invention will be described with reference to FIGS. 1 to 5.

Figure 1:
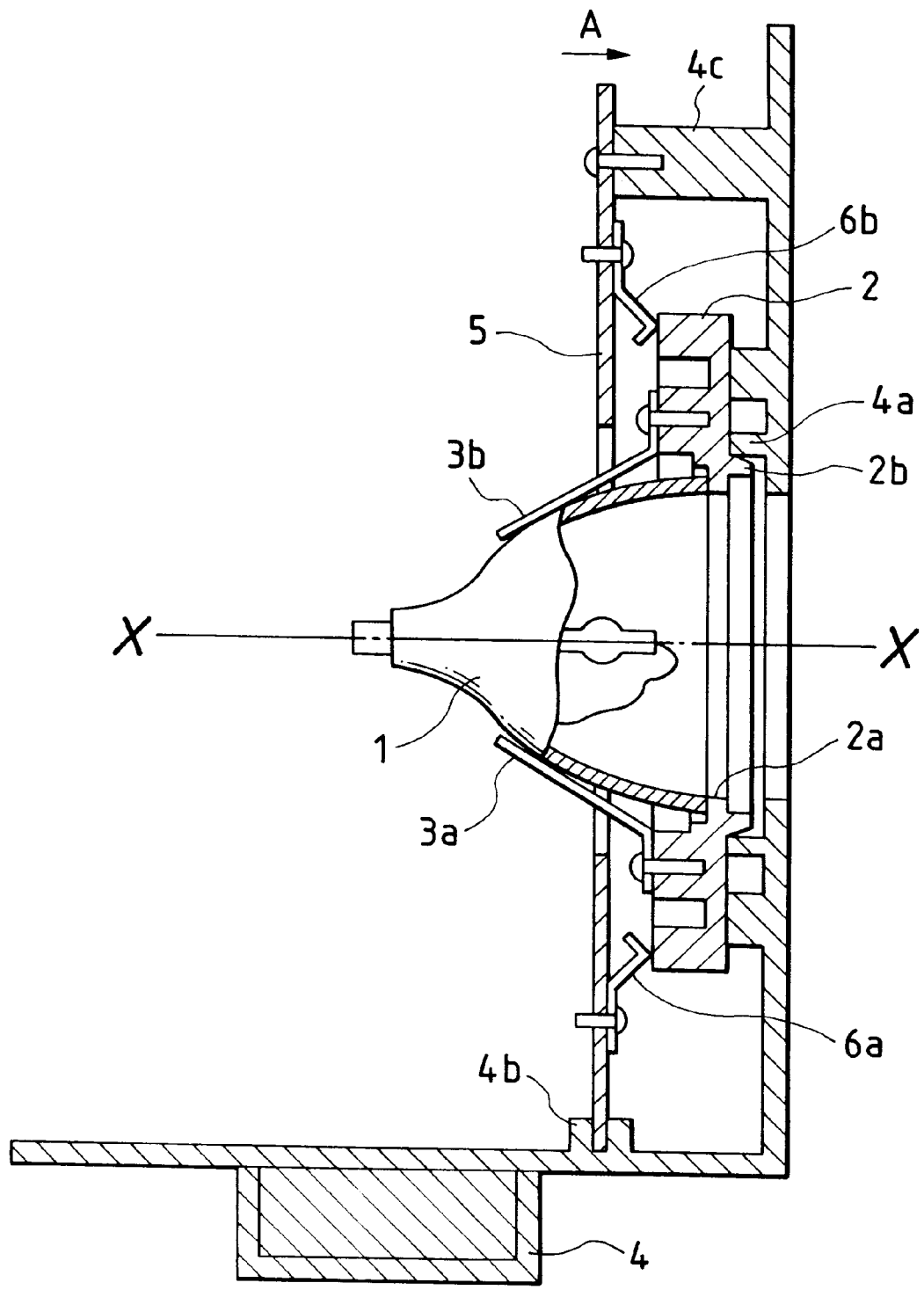
FIG. 1 is a cross-sectional view illustrating an embodiment of an illumination apparatus according to the present invention.
Figure 2:
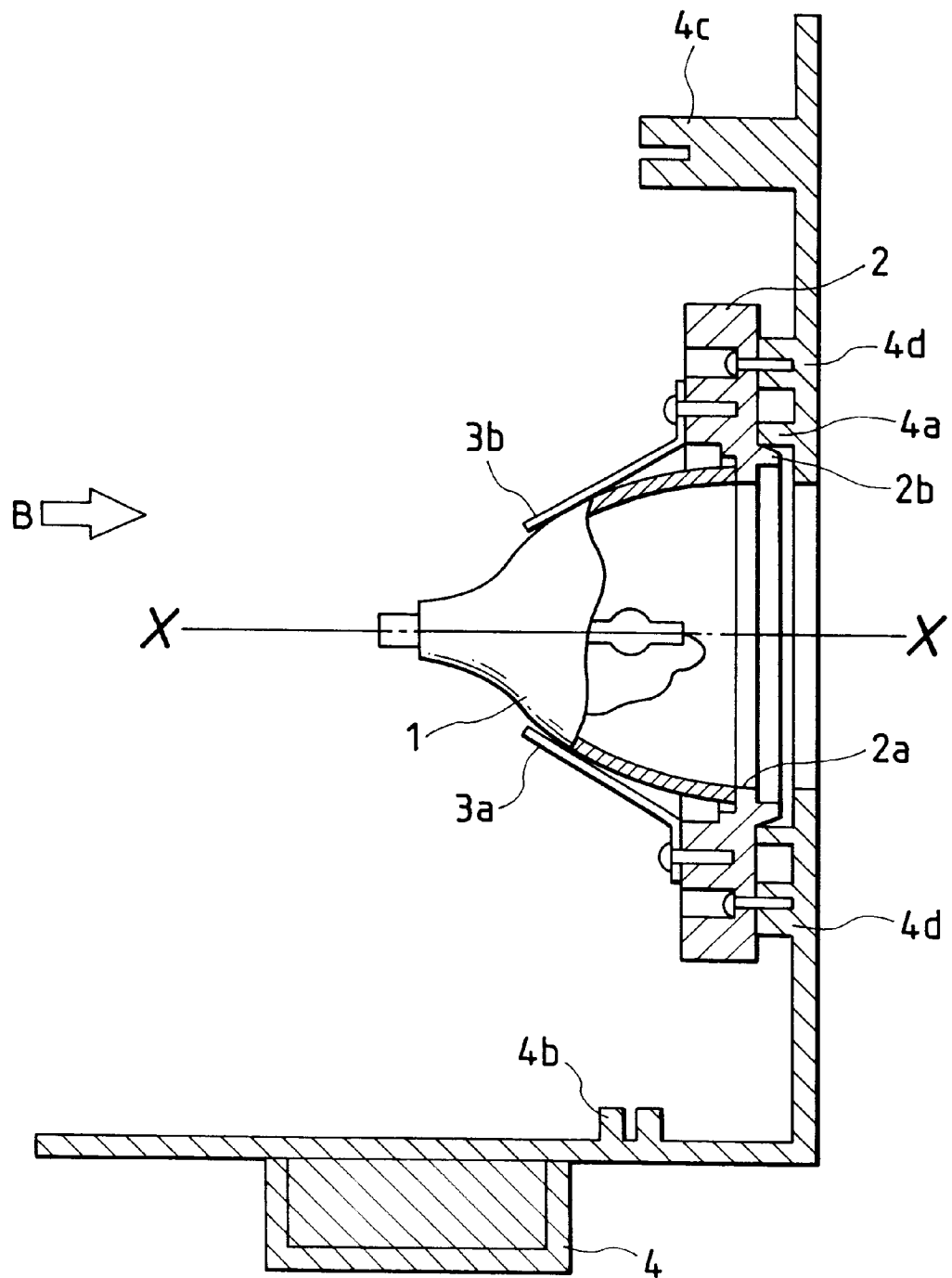
FIG. 2 is a cross-sectional view illustrating a mounting manner of a lamp of FIG. 1.
Figure 3:
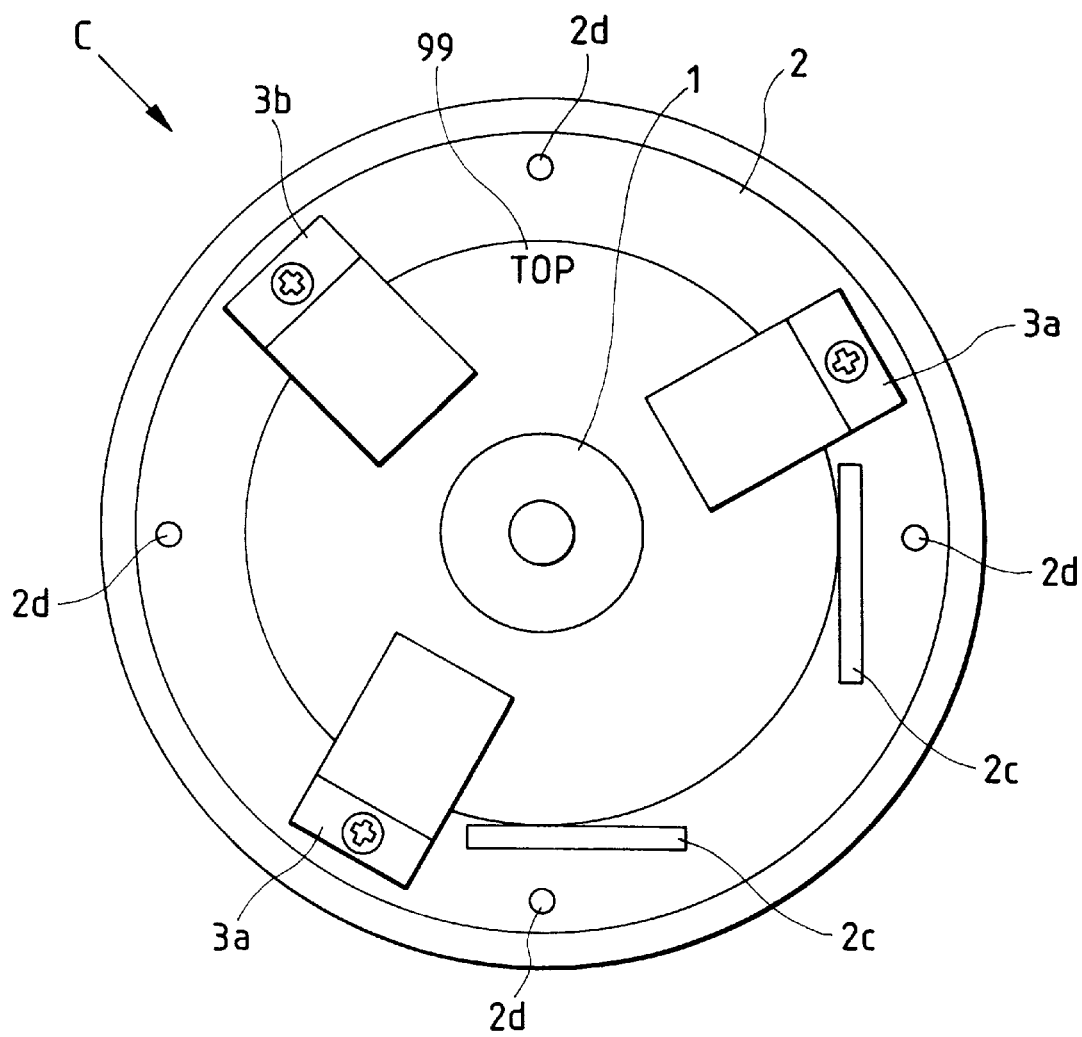
FIG. 3 is a rear view viewed FIG. 2 from B direction.
Figure 4:
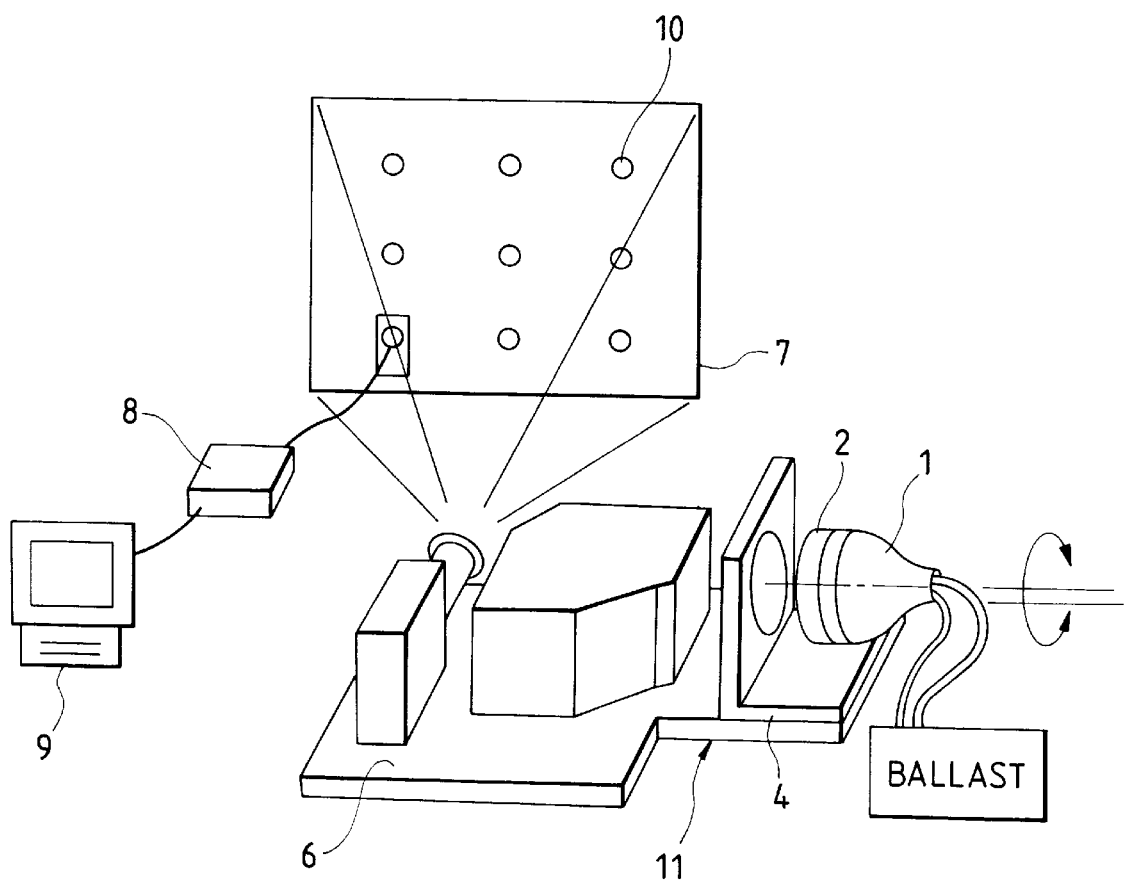
FIG. 4 is a view illustrating a rotational adjustment of the lamp.
Figure 5:
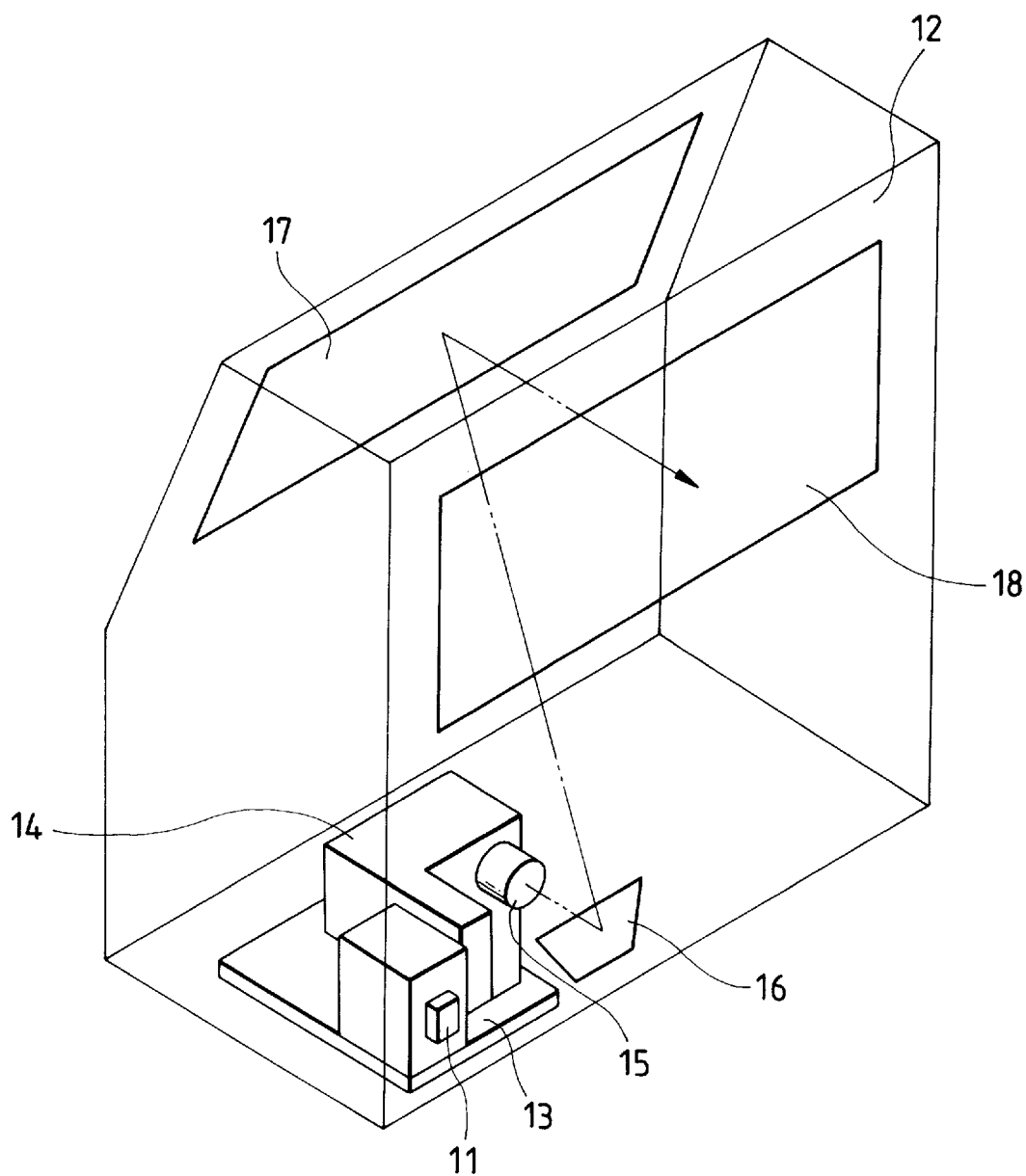
FIG. 5 is a perspective view of a rear projector provided with the illumination apparatus shown in FIGS. 1 to 4.

FIG. 1 is a cross-sectional view illustrating an illumination apparatus of this embodiment; FIG. 2 is a cross-sectional view illustrating the mounting manner of a lamp of this embodiment; FIG. 3 is a rear view viewed FIG. 2 from B direction; FIG. 4 is a view illustrating the rotational adjustment of the lamp; and FIG. 5 is a perspective view of a rear projector provided with the illumination apparatus of this embodiment.

In FIGS. 1 to 3, reference numeral 1 designates a lamp with a reflection shade used as a light source. Reference numeral 2 designates a lamp holder comprised of a circular-plate holding member for holding the lamp 1. A lamp opening portion 2a is formed in a central portion of the holder 2, and a fitting circular rib 2b is formed at the front periphery of the opening portion 2a.

On a rear surface side (lamp mounting side) of the lamp holder 2, there are arranged ribs 2c for providing reference surfaces positioned a predetermined distance from an optical axis (a center) of the lamp 1, which is to be mounted, and located at 90-degree and 180-degree places from an indication "TOP" 99 printed for the lamp mounting (see FIG. 3) in a clockwise direction, respectively, and holes 2d positioned 90 degrees away from each other. Reference numerals 3a and 3b designate leaf springs for exerting an offset spring force to the lamp 1 to fix the lamp 1 to the lamp holder 2, respectively. Two leaf springs 3a and one leaf spring 3b are arranged, and the spring force of the leaf spring 3b is stronger than the spring force of the leaf springs 3a. Reference numeral 4 designates an L-shaped lamp panel acting as a support member for fixing the lamp holder 2. On a rear surface of the lamp panel 4, there are arranged a circular rib 4a which is to be fitted into the periphery of the circular rib 2b of the lamp holder 2, and a boss 4c for fixing a hold-down plate 5 for holding down the lamp holder 2 described later. On a bottom inner surface of the lamp panel 4, a groove rib 4b for engaging the lamp holder hold-down plate 5. Reference numeral 5 designates the lamp holder hold-down plate provided with springs 6a and 6b for pressing a rear surface of the lamp holder 2 such that the lamp holder 2 is rotatable about the optical axis.

The adjustment of spring forces of the leaf springs 3a and 3b is carried out by adjusting bending angles of the springs in this embodiment, but it is also possible by the adjustment of widths and thicknesses of the leaf springs.

In the above-discussed embodiment, a manner for appropriately fitting the lamp 1 to the lamp holder 2 will be described with reference to FIG. 3.

As illustrated in FIG. 3, the lamp 1 is fixed to the lamp holder 2 with the lamp 1 being pressed in C direction in an offset manner by the leaf springs 3a and 3b.

Then, positions of the lamp 1, which are 90 degrees and 180 degrees away from the indication "TOP" 99 in a clockwise direction, are pressed against the ribs 2c of the lamp holder 2, so that the optical-axis center of the lamp 1 and the center of the lamp holder 2 are caused to be coincident with each other. There are arranged two leaf springs 3a and one leaf spring 3b, and the spring force of the leaf springs 3b is set stronger than that of the leaf spring 3a. Therefore, the lamp 1 is assuredly pressed in an offset manner.

When the lamp holder 2 holding the lamp 1 is to be mounted to the lamp panel 4, the circular rib 4a of the lamp panel 4 is fitted to the periphery of the circular rib 2b of the lamp holder 2 such that the lamp 1 is rotatable about its optical axis X. For this purpose, the lamp 1 is put in an aperture of the lamp holder hold-down plate 5, and the lamp holder 2 is pressed against the lamp panel 4 by the leaf springs 6a and 6b. One end of the hold-down plate 5 is inserted into the groove rib 4b of the lamp panel 4, and the other end thereof is fixed to the boss 4c by a set screw or the like. An illumination apparatus 11 is thus constructed.

The operation of the lamp of the thus-fabricated illumination apparatus 11 of this embodiment will be described.

In FIG. 1, since the lamp holder 2 with the lamp 1 mounted thereto is rotatably fitted into the lamp panel 4, the lamp holder 2 can be manually rotated about the rotational axis X while being pressed in a direction of arrow A by the lamp holder hold-down plate 5.

How to reduce color unevenness on a screen by the rotational adjustment of the lamp will be described with reference to FIG. 4.

The illumination apparatus 11 of this embodiment is mounted to a reference optical system 6 having the same structure as that of an actual liquid crystal projector, and an image is projected on a screen 7. Then, the lamp 1 is rotated 45 degrees each and totally 360 degrees, and the color unevenness on the screen 7 is measured by a color illuminometer 8 each 45-degree rotation. Each data (for example, measured results on nine measurement points 10 on the screen 7) is taken in a personal computer 9, and the lamp 1 is fixed at a rotational-angle position at which data for minimizing the color unevenness on the screen 7 is obtained.

In this case, the lamp holder hold-down plate 5 of FIG. 1 may be removed from the lamp panel 4, and the lamp holder 2 with the lamp 1 mounted at the angle of the measured data for minimizing the color unevenness may be fixed to the lamp panel 4 by set screws or the like as shown in FIG. 2. The reason for the color unevenness on the screen changing according to the rotational angle of the lamp 1 is that the optical axis X of the lamp 1 is not necessarily coincident with the optical axis of the optical system 6 (an optical system 14 in FIG. 5) and hence an incidence condition of white light from the lamp 1 onto the optical system changes according to the rotational angle of the lamp 1.

Here, although the illumination apparatus 11 is mounted to the reference optical system 6 acting as a jig, the apparatus 11 may be mounted to each optical system of a product and the rotational adjustment of the lamp may be performed as described above.

How to fix the lamp holder 2 to the lamp panel 4 at the angle for minimizing the color unevenness will be described.

In FIGS. 2 and 3, the lamp holder 2 is fixed to the panel 4 at the angle for minimizing the color unevenness by aligning holes 2b provided at 90-degree intervals on the holder 2 and four bosses 4d of eight bosses 4d provided at 45-degree intervals on the panel 4 and using set screws. In this embodiment, the rotational adjustment of the lamp 1 can only be effected 45 degrees each since the lamp panel 4 has only eight bosses 4d. Each angle of the rotational adjustment, however, can be freely changed if the number of bosses on the lamp panel 4 for fixing the lamp holder 2 is increased. For example, the rotational adjustment of the lamp 1 can be conducted 30 degrees each when the number of bosses 4d on the lamp panel 4 is increased to twelve (30 degrees each).

FIG. 5 is a perspective view of a rear projector using the illumination apparatus 11 shown in FIGS. 1 to 4. In FIG. 5, reference numeral 12 designates a projector housing. Reference numeral 13 designates a projecting apparatus arranged in the housing 12 provided with the optical system 14 and a projection lens 15. Reference numeral 16 designates a first reflection mirror arranged in front of the projecting apparatus. Reference numeral 17 designates a second reflection mirror arranged on an upper portion of the housing 12. Reference numeral 18 designates a screen provided on a front surface of the housing 12. The optical systems 14 and 15 are optical systems disclosed in the above-mentioned Japanese Patent Application No. 8-322283 and Japanese Patent Application Laid-Open No. 63-116123, for example.

The projecting apparatus 13 is comprised of the optical system 14 including a dichroic mirror (color separation optical means) for separating projection light from a light source into three primary colors of red (R), green (G) and blue (B), liquid crystals (display means) provided for respective three colors for modulating light intensities of the three separated color components per each pixel, and a composition mirror (composition optical means) for composing the three separated color components R, G and B again, and a projection lens 15 for projecting a display image of the liquid crystal panel using the image light of R, G and B from the composition mirror.

The screen 18 is formed of light transmitting members, such as front plate, lenticular lens, and Fresnel lens, and an antireflection film is provided on each light transmitting plane of each transmitting member. The reflectance of the light transmitting plane is reduced to about a half by the antireflection film. As a result, the amount of light transmitting through the screen 18 is increased, and in addition thereto image overlapping on the front plate due to external light is reduced by decreasing the reflection amount of the external light. The antireflection film used here is about 130 nm in its optical film thickness, and fluorine-contained polymer with a refractive index of 1.34 is formed on the light transmitting surface of each transmitting member by dip coating.

In the thus-fabricated projector, white light from the lamp of the illumination apparatus 11 is supplied to the optical system 14, image projection light from the projecting apparatus 13 is projected by the projection lens 15, and the image is formed on the screen 18 through the first reflection mirror 16 and second reflection mirror 17. In this case, a clear color image can be projected by adjusting the rotational position of the lamp in the illumination apparatus 11 such that no color unevenness occurs on the screen 18.

The above-discussed projector is a rear projector, but the present invention can also be used in a front projector.

The above embodiment has the following features.

There are arranged a lamp holding member for holding a lamp and a support member for rotatably supporting the lamp holding member about its optical axis and fixing the lamp holding member.

The lamp holding member is fitted into and mounted to the support member, and a fitting portion of the lamp holding member is positioned inside a fitting portion of the support member. Hence, the size of the lamp holding member can be reduced, and the lamp is rotatable about its optical axis.

The lamp holding member has an abutment plane against which a reference surface of a light source is pressed, and the holding member is provided with a spring member for pressing and fixing the light source to the abutment plane. Hence, the lamp can be properly set and held on the optical axis X.

The lamp holding member is provided with three leaf springs as a spring member, and the spring force of the spring member mounted to one place is set stronger than that of the spring members mounted to two places. Hence the lamp can be properly set and held on the optical axis X.

The adjustment of the spring forces of the spring members is conducted by adjusting the thickness, bending angle and width of the leaf spring serving as the spring member. Hence the spring force can be readily adjusted.

In a projector apparatus including a light source means rotatable about the optical axis, display means and a color separation and composition optical system, color unevenness on a screen due to the structure of the color separation and composition optical system can be reduced by rotating the light source means about its optical axis.

The light source means is comprised of at least a lamp and a reflection shade, such as an ellipsoidal mirror and a parabolic mirror, and the light source means can be readily constructed thereby.

The projector apparatus is provided with the light source means including the lamp holding member for supporting the lamp and the support member for rotatably supporting the lamp holding member about the optical axis and fixing the lamp holding member, and thereby color unevenness on the screen can be reduced by the rotation of the lamp.

What is claimed is:

1. A method for reducing color unevenness in an image projected by a projector, said method comprising the steps of: obtaining information of the color unevenness on a screen at each rotational position of a lamp when rotating the lamp about its optical axis as a rotational axis, wherein said optical axis passes through said lamp; and seeking the rotational position at which the color unevenness is most reduced, based on the information of the color unevenness.

2. A method according to claim 1, the lamp being rotated being held by a rotatable holding member.

3. A method according to claim 2, the lamp including a light radiation tube and a concave mirror.

4. A method according to claim 3, the concave mirror including an ellipsoidal mirror or a parabolic mirror.

5. A method according to claim 1, wherein the projector includes a first optical system for separating white light from the lamp into light of red, green and blue, a first panel for modulating the light of red per each pixel, a second panel for modulating the light of green per each pixel, a third panel for modulating the light of blue per each pixel, a projection lens, and a second optical system for superimposing the modulated light of red, green and blue in projected image, such as that displayed on a screen, in cooperation with a projection lens.

6. A method according to claim 2, wherein the projector includes a first optical system for separating white light from the lamp into light of red, green and blue, a first panel for modulating the light of red per each pixel, a second panel for modulating the light of green per each pixel, a third panel for modulating the light of blue per each pixel, a projection lens, and a second optical system and a second optical system for superimposing the modulated light of red, green and blue in a projected image, such as that displayed on a screen, in cooperation with a projection lens.

7. A method according to claim 3, wherein the projector includes a first optical system for separating white light from the lamp into light of red, green and blue, a first panel for modulating the light of red per each pixel, a second panel for modulating the light of green per each pixel, a third panel for modulating the light of blue per each pixel, a projection lens, and a second optical system for superimposing the modulated light of red, green and blue in a projected image, such as that displayed on a screen, in cooperation with a projection lens.

8. A method according to claim 4, wherein the projector includes a first optical system for separating white light from the lamp into light of red, green and blue, a first panel for modulating the light of red per each pixel, a second panel for modulating the light of green per each pixel, a third panel for modulating the light of blue per each pixel, a projection lens, and a second optical system for superimposing the modulated light of red, green and blue in a projected image, such as that displayed on a screen, in cooperation with a projection lens.

9. A method according to claim 5, wherein the first, second and third panels include liquid crystal display elements, respectively.

10. A method according to claim 6, wherein the first, second and third panels include liquid crystal display elements, respectively.

11. A method according to claim 7, wherein the first, second and third panels include liquid crystal display elements, respectively.

12. A method according to claim 8, wherein the first, second and third panels include liquid crystal display elements, respectively.

13. A method for reducing color unevenness in an image projected by a projector, said method comprising the steps of:

obtaining information of the color unevenness on a plane on which said image is projected, at each rotational position of a lamp when rotating the lamp about its optical axis as a rotational axis, wherein said optical axis passes through said lamp; and seeking the rotational position at which the color unevenness is most reduced, based on the information of the color unevenness.

* * * * *

UNITED STATES PATENT AND TRADEMARK OFFICE
CERTIFICATE OF CORRECTION

PATENT NO.    : 6,089,730
DATED         : July 18, 2000
INVENTOR(S)   : Ritsuo Machii It is certified that error appears in the above-identified patent and that said Letters Patent is hereby corrected as shown below:

Column 6,
Line 8, "blue in projected" should read -- blue in a projected --.

Signed and Sealed this

Thirtieth Day of July, 2002

Attest:

Attesting Officer

JAMES E. ROGAN
Director of the United States Patent and Trademark Office